(12) United States Patent
Prociw et al.

(10) Patent No.: US 8,276,387 B2
(45) Date of Patent: *Oct. 2, 2012

(54) GAS TURBINE ENGINE FUEL CONVEYING MEMBER

(75) Inventors: Lev Alexander Prociw, Elmira (CA);
Harris Shafique, Longueuil (CA);
Jason Fish, Brampton (CA); Bhawan B. Patel, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,172

(22) Filed: Feb. 4, 2011

(65) Prior Publication Data

US 2011/0120142 A1 May 26, 2011

Related U.S. Application Data

(60) Division of application No. 12/209,730, filed on Sep. 12, 2008, now Pat. No. 7,937,926, which is a continuation of application No. 11/034,838, filed on Jan. 14, 2005, now abandoned.

(51) Int. Cl.
*F02C 1/00* (2006.01)
*F02G 3/00* (2006.01)

(52) U.S. Cl. ................. 60/739; 60/734; 60/796; 60/800

(58) Field of Classification Search .................... 60/739, 60/796, 800, 798, 734
See application file for complete search history.

(56) References Cited

U.S. PATENT DOCUMENTS

| 1,081,950 | A | | 12/1913 | Eller |
| 2,151,540 | A | | 3/1939 | Varga |
| 2,443,373 | A | | 6/1948 | Borsoff |
| 2,946,185 | A | | 7/1960 | Bayer |
| 3,027,715 | A | * | 4/1962 | Morris ............................ 60/796 |
| 3,147,594 | A | * | 9/1964 | Hill et al. ........................ 60/739 |
| 3,213,523 | A | | 10/1965 | Boehler |
| 3,472,025 | A | | 10/1969 | Simmons et al. |
| 3,768,251 | A | * | 10/1973 | Camboulives et al. ......... 60/796 |
| 3,775,975 | A | * | 12/1973 | Stenger et al. .................. 60/798 |
| 4,028,888 | A | * | 6/1977 | Pilarczyk ........................ 60/798 |
| 4,100,733 | A | | 7/1978 | Striebel et al. |
| 4,322,945 | A | | 4/1982 | Peterson et al. |

(Continued)

FOREIGN PATENT DOCUMENTS

CA 1013153 7/1977

(Continued)

OTHER PUBLICATIONS

U.S. Appl. No. 11/220,849, Prociw et al.

(Continued)

*Primary Examiner* — William H Rodriguez
(74) *Attorney, Agent, or Firm* — Norton Rose Canada LLP

(57) ABSTRACT

A fuel conveying member of a gas turbine engine is described and includes a fuel manifold defining an annular fuel flow passage through a body of the fuel manifold. A plurality of fuel nozzles extend from the manifold in fluid flow communication with the annular fuel flow passage. The fuel manifold includes integral attachment lugs thereon for mounting the fuel manifold within the gas turbine engine. The attachment lugs are adapted to receive pins therein and provide a mounting mechanism which allows for thermal expansion of the fuel manifold relative to a surrounding support structure to which the fuel manifold is mounted via the attachment lugs.

22 Claims, 3 Drawing Sheets

U.S. PATENT DOCUMENTS

| | | | |
|---|---|---|---|
| 4,327,547 A * | 5/1982 | Hughes et al. | 60/39.463 |
| 4,332,626 A | 6/1982 | Hood et al. | |
| 4,377,420 A | 3/1983 | Granatek et al. | |
| 4,404,806 A | 9/1983 | Bell, III et al. | |
| 4,472,133 A * | 9/1984 | Petersen et al. | 431/3 |
| 4,483,137 A | 11/1984 | Faulkner | |
| 4,703,888 A * | 11/1987 | Kawamura et al. | 237/2 A |
| 4,870,943 A | 10/1989 | Bradley | |
| 5,036,657 A * | 8/1991 | Seto et al. | 60/39.281 |
| 5,197,288 A * | 3/1993 | Newland et al. | 60/734 |
| 5,253,471 A | 10/1993 | Richardson | |
| 5,263,314 A * | 11/1993 | Anderson | 60/39.094 |
| 5,271,218 A * | 12/1993 | Taylor | 60/797 |
| 5,271,219 A | 12/1993 | Richardson | |
| 5,279,112 A * | 1/1994 | Halila | 60/39.094 |
| 5,339,845 A * | 8/1994 | Huddas | 134/169 A |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |
| 5,797,266 A | 8/1998 | Brocard et al. | |
| 5,848,525 A | 12/1998 | Spencer | |
| 5,881,550 A * | 3/1999 | Toelle | 60/39.094 |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,463,739 B1 | 10/2002 | Mueller et al. | |
| 6,487,860 B2 * | 12/2002 | Mayersky et al. | 60/739 |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 6,871,792 B2 | 3/2005 | Pellizzari | 239/5 |
| 7,028,484 B2 * | 4/2006 | Prociw et al. | 60/739 |
| 7,540,157 B2 * | 6/2009 | Fish | 60/798 |
| 7,565,807 B2 * | 7/2009 | Prociw et al. | 60/799 |
| 7,607,226 B2 * | 10/2009 | Patel et al. | 29/890.08 |
| 7,617,683 B2 * | 11/2009 | Prociw et al. | 60/739 |
| 7,654,088 B2 * | 2/2010 | Shafique et al. | 60/739 |
| 7,703,286 B2 * | 4/2010 | Morenko et al. | 60/734 |
| 7,703,289 B2 * | 4/2010 | Rudrapatna et al. | 60/772 |
| 7,721,546 B2 * | 5/2010 | Fish et al. | 60/739 |
| 7,743,612 B2 * | 6/2010 | Morenko | 60/739 |
| 7,854,120 B2 * | 12/2010 | Olver | 60/739 |
| 7,856,825 B2 * | 12/2010 | Fish et al. | 60/739 |
| 7,874,164 B2 * | 1/2011 | Gandza | 60/796 |
| 7,926,286 B2 * | 4/2011 | Morenko et al. | 60/772 |
| 7,937,926 B2 * | 5/2011 | Prociw et al. | 60/39.094 |
| 7,942,002 B2 * | 5/2011 | Fish | 60/739 |
| 8,033,113 B2 * | 10/2011 | Patel et al. | 60/742 |
| 8,051,664 B2 * | 11/2011 | Fish | 60/800 |
| 8,074,452 B2 * | 12/2011 | Prociw et al. | 60/739 |
| 8,096,130 B2 * | 1/2012 | Morenko | 60/739 |
| 8,096,131 B2 * | 1/2012 | Ziaei et al. | 60/739 |
| 2003/0014979 A1 | 1/2003 | Summerfield et al. | |
| 2004/0040306 A1 * | 3/2004 | Prociw et al. | 60/740 |
| 2005/0188699 A1 | 9/2005 | Shafique et al. | |
| 2006/0156731 A1 | 7/2006 | Prociw et al. | |
| 2006/0156733 A1 | 7/2006 | Prociw et al. | |
| 2006/0218925 A1 | 10/2006 | Prociw et al. | |
| 2008/0092545 A1 * | 4/2008 | Fish et al. | 60/739 |
| 2009/0025687 A1 * | 1/2009 | Fish | 123/470 |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/466,137, Fish et al.
U.S. Appl. No. 11/513,030, Morenko et al.
U.S. Appl. No. 11/532,611, Rudrpatna et al.
U.S. Appl. No. 11/535,185, Morenko et al.
U.S. Appl. No. 11/534,381, Fish et al.
U.S. Appl. No. 11/552,240, Patel et al.

* cited by examiner

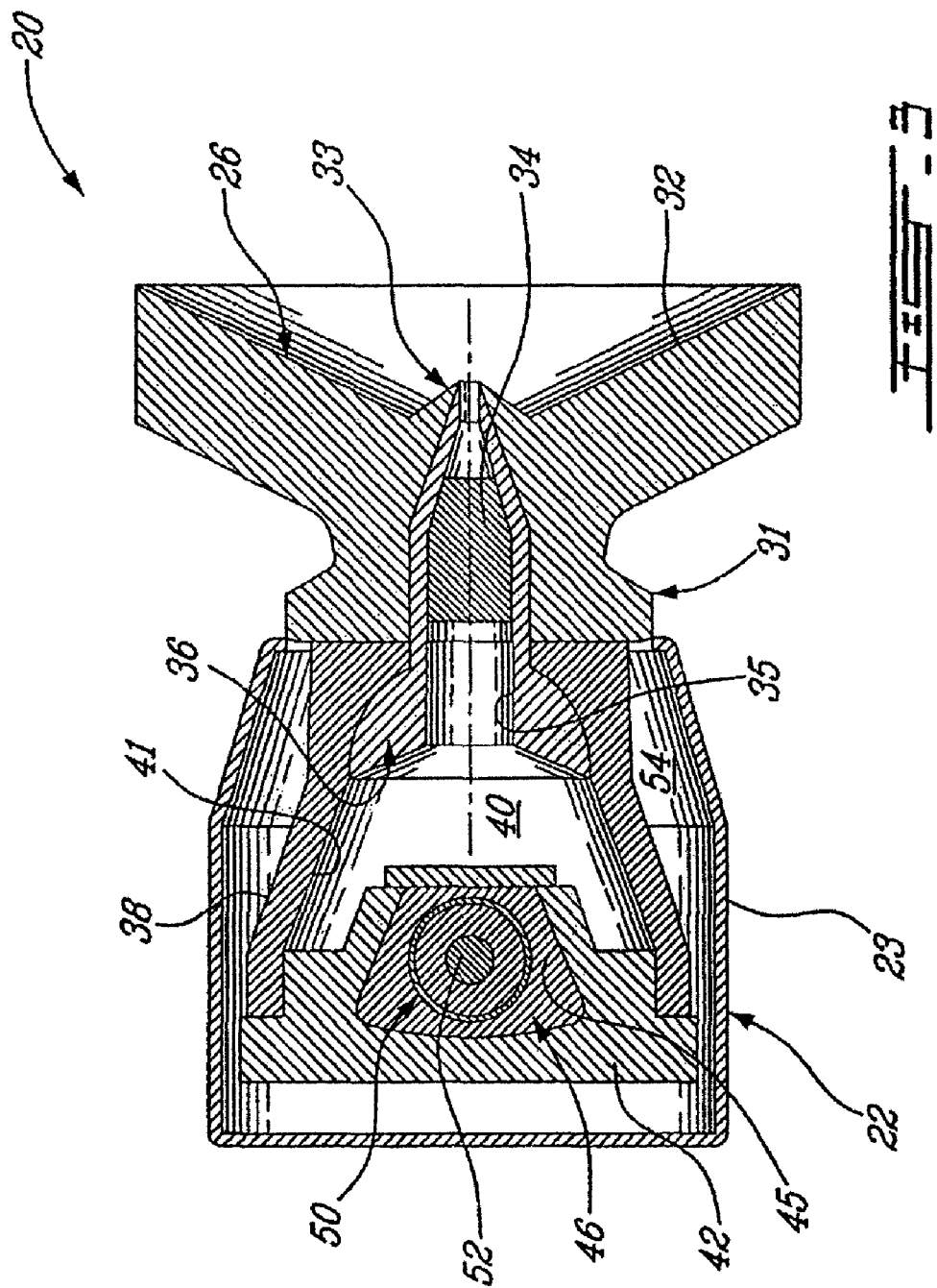

US 8,276,387 B2

GAS TURBINE ENGINE FUEL CONVEYING MEMBER

CROSS-REFERENCE TO RELATED APPLICATIONS

The present application is a divisional of U.S. patent application Ser. No. 12/209,730 filed Sep. 12, 2008, now U.S. Pat. No. 7,937,936, which is a continuation of U.S. patent application Ser. No. 11/034,838 filed Jan. 14, 2005, now abandoned, the entire content of both of which is incorporated herein by reference.

TECHNICAL FIELD

The invention relates generally to a fuel conveying member in a gas turbine engine.

BACKGROUND

Fuel conveying passages, conduits, manifolds and the like employed in gas turbine engines tend to gradually accumulate a build up of carbon or coke. Cleaning fuel passages requires chemical solvents or pyrolysis (heating and pressurizing with air). While such pyrolytic cleaning processes are generally effective they are often not easily accomplished. U.S. Pat. No. 4,377,420 to Granatek et al. discloses an apparatus which is quite large and expensive. Further, in order to heat up a relatively large component, such as the intermediate turbine case 20 depicted by Granatek et al. for example, the enclosed furnace 34 must be large.

Accordingly, there is a need to provide an improved fuel conveying member of a gas turbine engine.

SUMMARY OF THE INVENTION

There is provided a fuel conveying member of a gas turbine engine comprising a fuel manifold defining an annular fuel flow passage through a body of the fuel manifold, the manifold having a plurality of fuel nozzles extending therefrom in fluid flow communication with said annular fuel flow passage, the fuel manifold including integral attachment lugs thereon for mounting the fuel manifold within the gas turbine engine, the attachment lugs being adapted to receive pins therein and providing a mounting mechanism which allows for thermal expansion of the fuel manifold relative to a surrounding support structure to which the fuel manifold is mounted via the attachment lugs.

There is also provided a gas turbine engine including a compressor, a combustor and a turbine, comprising: a fuel manifold defining an annular fuel flow passage through a body of the fuel manifold, the body of said fuel manifold being composed of a first heat conducting material, the manifold having a plurality of fuel nozzles extending therefrom in fluid flow communication with said annular fuel flow passage, the fuel manifold being supported by a fuel inlet and integral attachment lugs thereon which mount the fuel manifold adjacent the combustor within the gas turbine engine, the integral attachment lugs matingly receive corresponding pins therein, the pins being engaged to a support structure surrounding the fuel manifold, the attachment lugs and the mating pins being configured for relative sliding motion therebetween such as to provide a mounting mechanism which allows for thermal expansion of the fuel manifold relative to the surrounding support structure at high temperatures.

This also provided a fuel injection system for a gas turbine engine including a compressor, a combustor and a turbine, comprising: an annular internal fuel manifold disposed adjacent the combustor within a surrounding gas generator casing, the fuel manifold having at least one fuel conveying passage therein in fluid flow communication with a plurality of fuel injection nozzles disposed about the fuel manifold and adapted to spray fuel into the combustor; and a mounting system supporting and positioning the fuel manifold relative to the combustor within said gas generator casing, the mounting system including at least two pin supports circumferentially spaced apart about the annular fuel manifold, the pin supports including ring lugs and mating pins disposed between the fuel manifold and the surrounding gas generator casing, the pins co-operating with the aligned ring lugs such that the ring lugs are slidingly disposed around the pin for relative sliding displacement therebetween, the pin supports providing axial constraint for the fuel manifold while permitting radially displacement thereof relative to the surrounding gas generator casing due to thermal size change.

There is further provided an internal fuel manifold assembly for a gas turbine engine comprising: a fuel manifold ring having at least one fuel conveying passage therein in fluid flow communication with a plurality of fuel injection nozzles adapted for spraying fuel into a combustor of the gas turbine engine; and a mounting system for supporting and positioning the fuel manifold ring within the gas turbine engine, the mounting system including at least one lug disposed on a periphery of the fuel manifold ring and a fuel inlet to the annular fuel manifold body, the lug having a radially oriented hole therein adapted for slidingly receiving a corresponding radially extending support pin therein.

Further details of these and other aspects will be apparent from the detailed description and figures included below.

DESCRIPTION OF THE DRAWINGS

Reference is now made to the accompanying figures depicting aspects of the present invention, in which:

FIG. 3 is a cross-sectional view of the fuel manifold of FIG. 2, taken through line 3-3 thereof.

DETAILED DESCRIPTION

Figure 1:
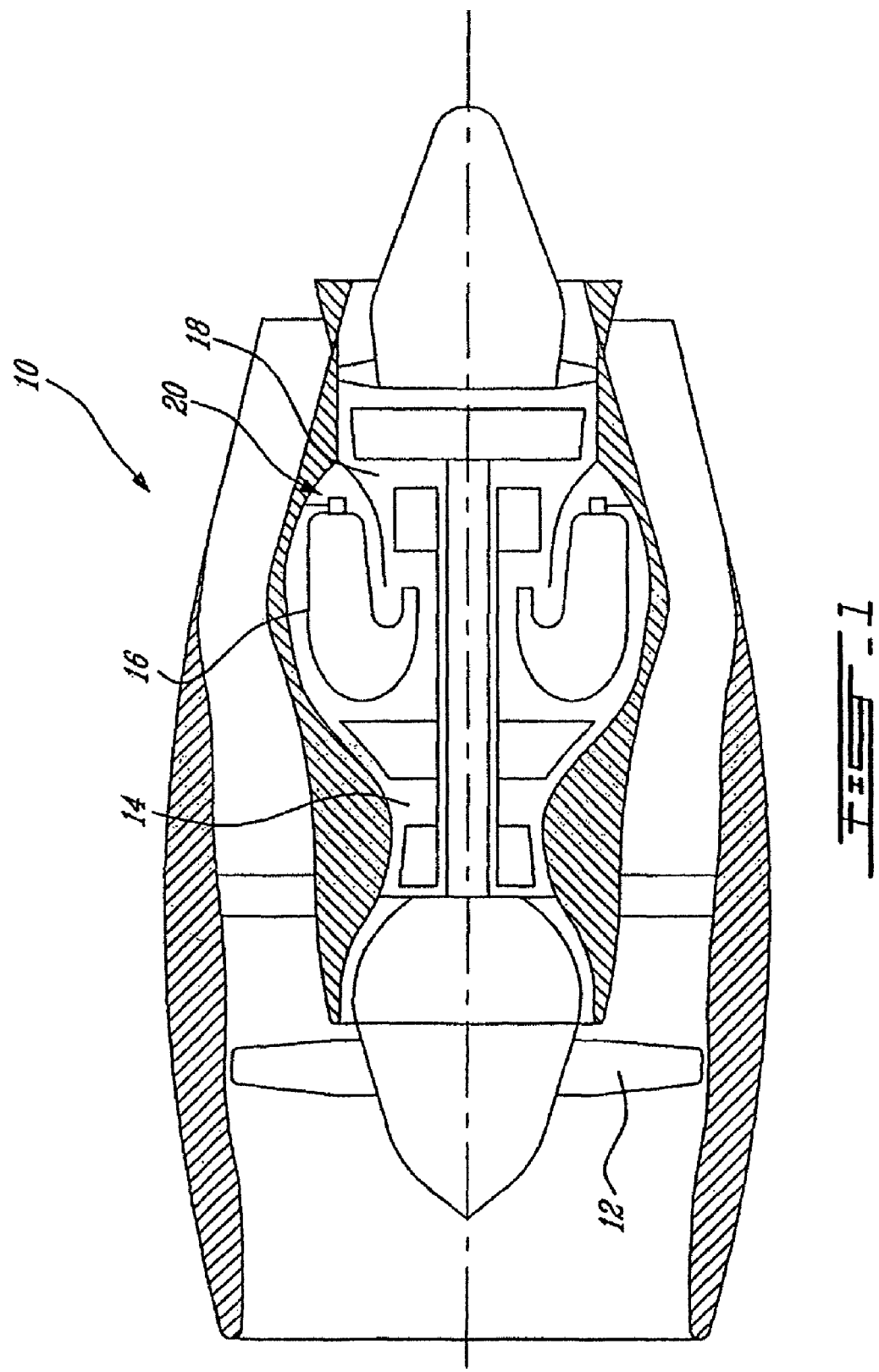
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
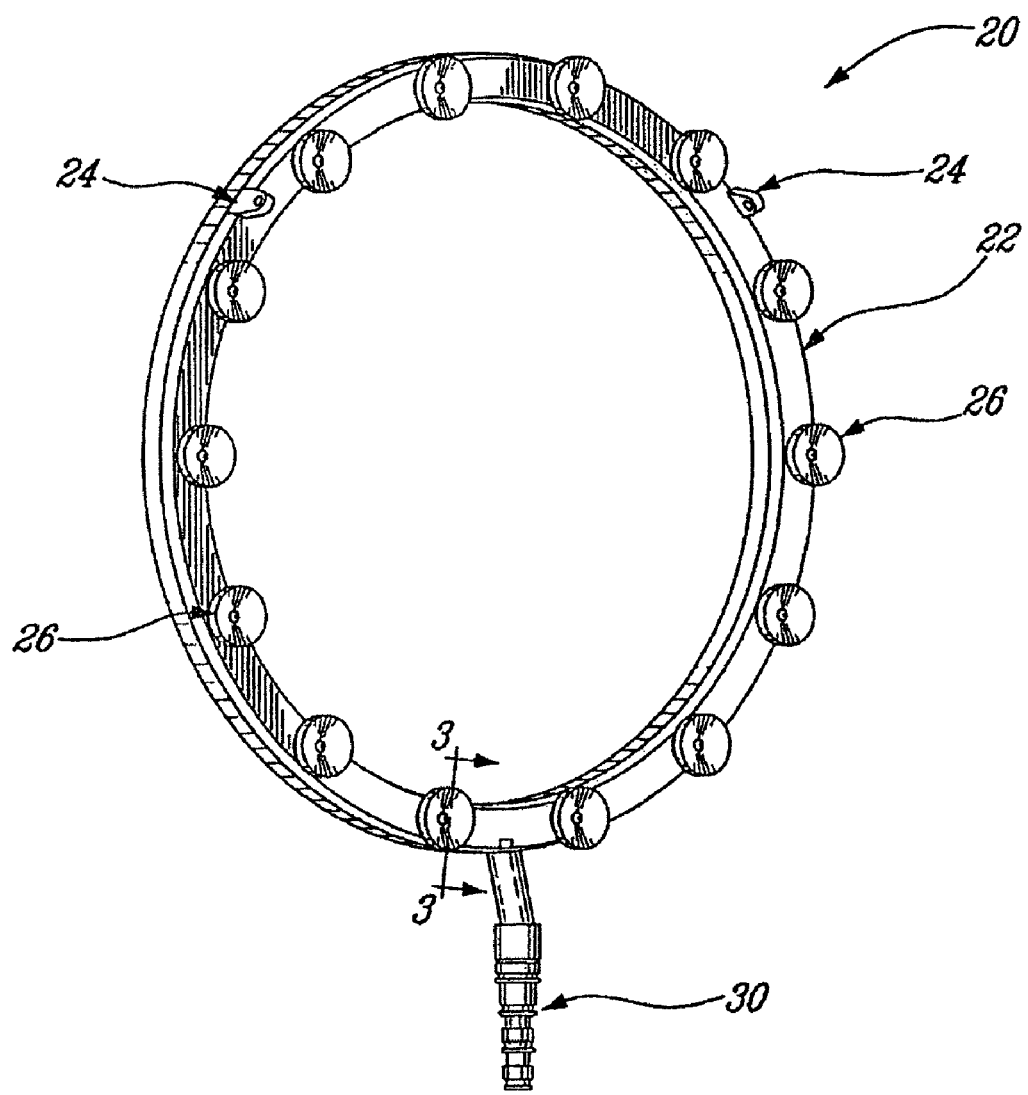
FIG. 2 is a perspective view of a fuel manifold in accordance with the present invention, for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold ring 22 which is mounted adjacent to the combustor 16 in the gas turbine engine 10. The fuel manifold ring 22 is preferably mounted to the combustor 16 or to surrounding support structure via several integral attachment lugs 24 which receive pins (not shown) engaged to the support structure. This provides a mounting mechanism which allows for thermal expansion of the fuel manifold ring 22 at high temperatures. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the annular fuel manifold ring 22 via fuel inlet 30, and is distributed within the manifold ring 22 such that fuel flow is provided to each of the fuel nozzles assemblies. Both the fuel manifold ring 22 and the fuel injecting nozzle assemblies 26 comprise fuel conveying members, within which a heating device in accordance with the present invention is preferably provided, as will be discussed in further detail below.

Referring now to FIG. 3, the interior construction of one embodiment of the fuel manifold ring 22 and a fuel nozzle assembly 26 of the fuel injection system 20 is depicted. Particularly, the fuel nozzle assembly 26 projects axially (relative to the central longitudinal axis 11 of the gas turbine engine 10) outwardly from fuel manifold ring 22, and includes a central body 31 from which air swirler vanes 32 project about a central spray tip opening 33 defined in the central body 31 and through which the fuel exits the fuel nozzle assembly 26. An inner fuel nozzle portion 36 defines a central fuel channel 35 therethrough, which extends between a fuel source passage 40 and the spray tip opening 33. The inner fuel nozzle portion 36 is preferably engaged with the surrounding central body 31 of the nozzle assembly by a local braze attachment which provides a seal therebetween. A fuel swirler 34 is also preferably provided within the central fuel channel 35 of the inner fuel nozzle portion 36. The fuel flow passage 40 is defined within interior walls 41 thereof, and preferably defines an annular passage provided within the fuel manifold ring 22, however it is to be understood that the fuel flow passage could be provided separately in each fuel nozzle assembly 26 rather than extending throughout a common manifold. However, a common manifold renders the present invention more viable, as only a single fuel conveying area need be heated, as will be described in greater detail below. The central body 31 includes a rear body portion 38 which projects into the fuel manifold ring 22 and at least partially defines the fuel source passage 40 therewithin. A rear sealing plate 42 is fastened to the rear walls of the rear body portion 38 at the open end thereof, thereby enclosing the fuel flow passage 40 of the manifold. Preferably, the rear sealing plate 42 is brazed in place about the full circumference of the manifold ring. The exterior of the annular fuel manifold ring 22 comprises an outer heat shield 23 which covers the ring. This provides the fuel manifold ring 22 with thermal protection from the high temperature environment of the combustion chamber.

The fuel conveying members such as the fuel nozzles and the fuel manifold are further provided with at least one heating means such as the heating device 50 disposed in heat conducting communication with a fuel flow passage, such as the manifold fuel passage 40 for example, in at least one of the fuel conveying members such as the fuel nozzles 26 and the fuel manifold 22. The heating device 50 is operable to heat up the fuel flow passages to a temperature which is sufficiently high to allow for pyrolysis of any carbon-based deposits which may have accumulated with the fuel flow passages. Such carbon-based deposits can include carbon or coke which tends build up on passage walls over time and eventually partially clog the flow of fuel therethrough. By heating up the preferably metallic fuel conveying passages to a high enough temperature to permit expansion thereof, any adhesion of the carbon and the wall surfaces of the passage is broken as a result of a thermal growth mismatch between the carbon and the metallic wall surfaces, thus loosening the carbon deposits. Thus, the fuel conveying member can be so cleaned in situ, using the integral heating device 50, without necessarily requiring complete removal of the entire part for insertion into a large oven, or the like. Cleaning of the fuel conveying member is therefore possible in situ within the engine, and even "on the wing" if required (i.e. without requiring removal of the engine from the aircraft).

Preferably, once the fuel flow passages of the fuel conveying members have been heated as described using the integrally provided heating device 50, pressurised air is subsequently fed through the fuel flow passages. Preferably, the pressurized air is fed into the fuel flow passages of the fuel manifold via the fuel inlet 30, which is disconnected from the rest of the fuel system prior to conducting the present pyrolytic cleaning process. However, it remains possible to introduce the pressurized air into the fuel flow passages of the particularly fuel conveying member via another suitable inlet port. The presence of flowing air, and more particularly oxygen in the air, helps to pyrolize the dislodged carbonaceous deposits, forming generally carbon monoxide and/or carbon dioxide. Thus pressurized air/oxygen forced through the passages provides a deposit removal means which further improves the pyrolysis of the carbonaceous deposits, as does enriching the air with oxygen. Although the fuel flow passages can be cleaned using only the heating device 50, best results are achieved with pressurized air is also used, reducing the overall time required to perform such a maintenance procedure.

Referring back to FIG. 3 in more detail, the heating device 50 is preferably integrated within the fuel manifold ring 22, and more particularly embedded within the rear sealing plate 42 of the manifold ring. The heating device 50 is preferably contained within a heat conducting capsule 46, composed of a relatively soft conductive material such as aluminum, for example. The capsule 46 is disposed within a corresponding cavity 45 defined within the sealing plate 42, and remains in direct contact with the sealing plate 42 when disposed in the cavity 45. The encapsulation material of capsule 46 provides a substantially uniform heat distribution from the heating device 50 as it spreads, largely by conduction, to the rest of the fuel manifold 22 and the fuel nozzle assembly 26. The heating device 50 preferably comprises an electrical resistance heating element 52, such as an electrically conductive filament for example, which radiates heat when electricity is passed therethrough. Other types of integral heating devices can also be used, such as induction, fluidic, pneumatic, etc., however an electrical heating element is preferred for ease of operation. The electrical heating element 52 is preferably led out through the fuel inlet and terminates with electrical connectors or terminals (not shown), such that the electrical heating element 52 can be engaged to a suitable power supply, such as a battery or a DC power supply for example, to energize the electrical element of the heating device.

When cleaning the fuel flow passages using the heating device 50, any rubber sealing rings, or any other materials which may degrade by heat, are preferably removed prior to initiating the heating of the fuel passages by the heating device 50. If such a fuel flow passage cleaning is being performed directly in situ in the engine's operating environment, such as when still installed "on the wing" in the case of an airborne gas turbine engine, then the fuel inlet would also typically be disconnected from the fuel source prior to heating the fuel conveying members. The pressurized air used to help pyrolize the carbonaceous deposits may be provided by a portable supply or a suitable alternate pressurized air source, which is preferably engaged in fluid flow communication with the fuel inlet 30 of the manifold to inject pressurized air into the fuel manifold. It remains possible, however, to introduce the pressurized air into the fuel flow passage via another suitable inlet port.

External insulation is also preferably provided about at least part of the fuel conveying members, such that the amount of wasted power is reduced. As such, an insulator is provided about at least the central body 31 of the fuel manifold ring 22. Particularly, an insulating air cavity 54 surrounds the rear body walls 38 and the sealing plate 42, within which the fuel flow passage 40 is defined, and within the outer heat shield 23 of the fuel manifold ring 22. Further insulation may also be provided outside the heat shield 23, such that most of the heat generated by the heating device 50 is directed to the fuel flow passage 40 for pyrolysis.

The above description is meant to be exemplary only, and one skilled in the art will recognize that changes may be made to the embodiments described without department from the scope of the invention disclosed. For example, alternate configurations of fuel conveying members such as fuel manifolds and fuel nozzles can be used. Further, it is to be understood that the heating device could be integrated directly into the wall section without any intermediate material therebetween, or may have any other suitable configuration. Multiple heating devices may be employed, of same or different types and configurations. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. A fuel conveying member of a gas turbine engine comprising an annular fuel manifold defining an annular fuel flow passage through a body of the fuel manifold, the manifold having a plurality of fuel nozzles extending therefrom in fluid flow communication with said annular fuel flow passage, the fuel manifold including at least two integral attachment lugs circumferentially spaced apart on an outer periphery of the annular fuel manifold for mounting the fuel manifold within the gas turbine engine, the attachment lugs each including an axially projecting flange having a radially extending and substantially circular opening defined therethrough adapted to receive pins therein and providing a mounting mechanism which allows for thermal expansion of the fuel manifold relative to a surrounding support structure to which the fuel manifold is mounted via the attachment lugs, and wherein the fuel manifold includes a radially extending fuel inlet providing fuel flow to the fuel flow passage, the fuel inlet comprising a third support for said fuel manifold.

2. The fuel conveying member of claim 1, wherein the fuel inlet is disposed at a lowermost point of the annular fuel manifold.

3. The fuel conveying member of claim 2, wherein the two attachment lugs and the fuel inlet are circumferentially equally spaced apart about the annular fuel manifold.

4. The fuel conveying member of claim 1, wherein said attachment lugs and said pins mate together to define a support for said fuel manifold which provides axial constraint while permitting radial thermal expansion of the fuel manifold.

5. The fuel conveying member of claim 1, wherein the fuel conveying member includes a heating device disposed within a body of said fuel conveying member in heat transfer communication with said fuel flow passage, such that when activated said heating device heats said fuel flow passage to a temperature sufficiently high to permit pyrolysis of carbonaceous deposits in the fuel flow passage.

6. The fuel conveying member of claim 5, wherein the body of said fuel conveying member is composed of a first heat conducting material, and wherein said heating device includes a heating element embedded in a heat conducting capsule disposed in said body of the fuel conveying member, said heat conducting capsule being composed of a second heat conducting material softer than the first heat conducting material of said body thereby providing substantially uniform heat distribution throughout said fuel conveying member.

7. A gas turbine engine including a compressor, a combustor and a turbine, comprising: a fuel manifold defining an annular fuel flow passage through a body of the fuel manifold, the body of said fuel manifold being composed of a first heat conducting material, the manifold having a plurality of fuel nozzles extending therefrom in fluid flow communication with said annular fuel flow passage, the fuel manifold being supported by a fuel inlet and integral attachment lugs thereon which mount the fuel manifold adjacent the combustor within the gas turbine engine, the integral attachment lugs each directly and matingly receiving a corresponding pin therein, the pins being engaged to a support structure surrounding the fuel manifold, the attachment lugs and the mating pins being configured for relative sliding motion therebetween such as to provide a mounting mechanism which allows for thermal expansion of the fuel manifold relative to the surrounding support structure at high temperatures.

8. The gas turbine engine as defined in claim 7, wherein the fuel manifold is an annular fuel manifold ring, the attachment lugs include two lugs on the periphery of the fuel manifold ring, the two lugs and the fuel inlet being equally spaced apart about the circumference of the fuel manifold ring.

9. The gas turbine engine as defined in claim 8, wherein the fuel inlet is disposed at a lowermost point of the annular fuel manifold ring.

10. The gas turbine engine as defined in claim 9, wherein the two attachment lugs and the fuel inlet are circumferentially equally spaced apart about the annular fuel manifold ring.

11. The gas turbine engine as defined in claim 10, wherein said lugs and said pins mate together to define a support for said fuel manifold which provides axial constraint while permitting radial thermal expansion of the fuel manifold.

12. The gas turbine engine of claim 7, wherein heating means is disposed within said fuel manifold for heating said annular fuel flow passage to a pyrolysis temperature of carbonaceous deposits in said annular fuel flow passage, said heating means including a heat conducting capsule disposed in said body of the fuel manifold, the heat conducting capsule having a heating element embedded in a second heat conducting material which is softer than the first heat conducting material of said body of the fuel manifold, thereby providing substantially uniform heat distribution throughout said fuel manifold.

13. A fuel injection system for a gas turbine engine including a compressor, a combustor and a turbine, comprising:
an annular internal fuel manifold disposed adjacent the combustor within a surrounding gas generator casing, the fuel manifold having at least one fuel conveying passage therein in fluid flow communication with a plurality of fuel injection nozzles disposed about the fuel manifold and adapted to spray fuel into the combustor; and a mounting system supporting and positioning the fuel manifold relative to the combustor within said gas generator casing, the mounting system including at least two pin supports circumferentially spaced apart about the annular fuel manifold, the pin supports including ring lugs and mating pins disposed between the fuel manifold and the surrounding gas generator casing, the pins directly co-operating with the aligned ring lugs such that the ring lugs are slidingly disposed around the pin for relative sliding displacement therebetween, the pin supports providing axial constraint for the fuel manifold while permitting radially displacement thereof relative to the surrounding gas generator casing due to thermal size change.

14. The fuel injection system as defined in claim 13, wherein the fuel manifold includes a radially extending fuel inlet providing fuel flow to the fuel conveying passage, the fuel inlet comprising a third support for said fuel manifold.

15. The fuel injection system as defined in claim 14, wherein the fuel inlet is disposed at a lowermost point of the annular fuel manifold.

16. The fuel injection system as defined in claim 13, wherein the pins and the co-operating ring lugs of said pin supports are respectively engaged to the gas generator casing and the fuel manifold.

17. The fuel injection system as defined in claim 13, wherein the fuel manifold includes a heating device disposed within a body of said fuel manifold in heat transfer communication with said fuel conveying passage, such that when activated said heating device heats said fuel conveying passage to a temperature sufficiently high to permit pyrolysis of carbonaceous deposits in the fuel conveying passage.

18. The fuel conveying member of claim 17, wherein the body of said fuel manifold is composed of a first heat conducting material, and wherein said heating device includes a heating element embedded in a heat conducting capsule disposed in said body of the fuel manifold, said heat conducting capsule being composed of a second heat conducting material softer than the first heat conducting material of said body thereby providing substantially uniform heat distribution throughout said fuel conveying member.

19. An internal fuel manifold assembly for a gas turbine engine comprising:
   a fuel manifold ring having at least one fuel conveying passage therein in fluid flow communication with a plurality of fuel injection nozzles adapted for spraying fuel into a combustor of the gas turbine engine; and
   a mounting system for supporting and positioning the fuel manifold ring within the gas turbine engine, the mounting system including at least two lugs disposed on a periphery of the fuel manifold ring and a fuel inlet to the annular fuel manifold body, the lugs having a radially oriented substantially circular hole therein adapted for directly slidingly receiving a corresponding radially extending support pin therein, the lugs and the fuel inlet being equally spaced apart about the circumference of the fuel manifold ring.

20. The internal fuel manifold assembly as defined in claim 19, wherein said lug and said support pin mate together to define a support for said fuel manifold which provides axial constraint while permitting radial thermal expansion of the fuel manifold.

21. The internal fuel manifold assembly as defined in claim 19, wherein the fuel manifold ring includes a heating device disposed within a body of said fuel manifold ring in heat transfer communication with said fuel conveying passage, such that when activated said heating device heats said fuel conveying passage to a temperature sufficiently high to permit pyrolysis of carbonaceous deposits in the fuel conveying passage.

22. The fuel conveying member of claim 21, wherein the body of said fuel manifold ring is composed of a first heat conducting material, and wherein said heating device includes a heating element embedded in a heat conducting capsule disposed in said body of the fuel manifold, said heat conducting capsule being composed of a second heat conducting material softer than the first heat conducting material of said body thereby providing substantially uniform heat distribution throughout said fuel conveying member.

\* \* \* \* \*